United States Patent [19]

Slakmon

[11] 4,405,952
[45] Sep. 20, 1983

[54] APPARATUS FOR DETECTING FAULTY SECTORS AND FOR ALLOCATING REPLACEMENT SECTORS IN A MAGNETIC DISC MEMORY

[75] Inventor: Gilbert Slakmon, Paris, France

[73] Assignee: CII Honeywell Bull, Paris, France

[21] Appl. No.: 42,416

[22] Filed: May 25, 1979

[30] Foreign Application Priority Data

May 26, 1978 [FR] France .................. 78 15763

[51] Int. Cl.³ .............................................. G11B 5/09
[52] U.S. Cl. ...................................... 360/49; 360/39; 360/54
[58] Field of Search .............. 360/31, 39, 49, 54, 360/61, 48; 365/200

[56] References Cited

U.S. PATENT DOCUMENTS 3,643,243  2/1972  Johnson et al. .................. 360/63
3,997,876  12/1976  Frush ................................ 360/50
4,103,338  7/1978  Cizmic et al. .................... 366/31

Primary Examiner—Vincent P. Canney

[57] ABSTRACT

Each face of a magnetic disc memory is divided into sectors of a circle and into concentric tracks on which are recorded or from which are recovered binary data transferred between a central processing unit and the disc memory. Each sector of each track includes an address. One or more sectors on each track is a salvage sector, i.e., a sector where data are stored if a sector on the track is faulty. Faulty sectors on a track are detected and the order in which the faulty sectors are detected is indicated. In response to the detected faulty sectors and the indication of the order in which the faulty sectors are detected, as well as in response to addressing means for sectors of the memory, a number of replacement sectors equal to the number of detected faulty sectors is assigned at the end of a track address by the addressing means.

11 Claims, 23 Drawing Figures

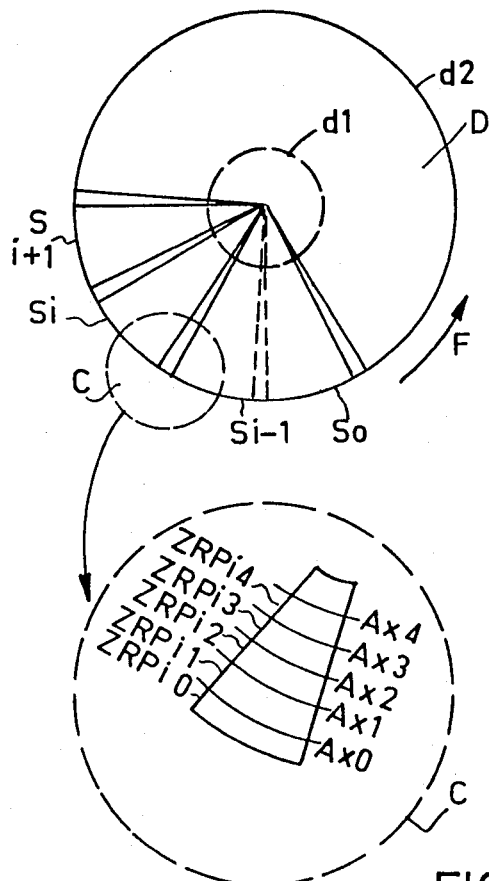
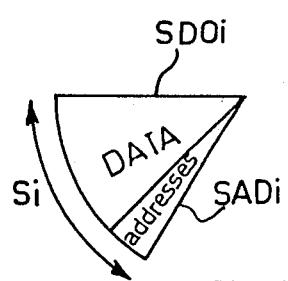
FIG.1a
FIG.1b
FIG.1c
FIG.1d

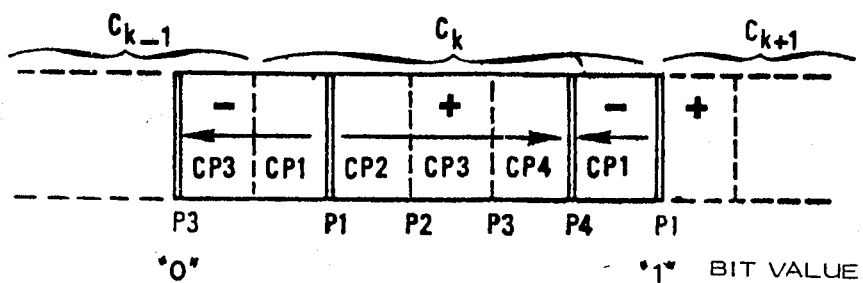
FIG.2
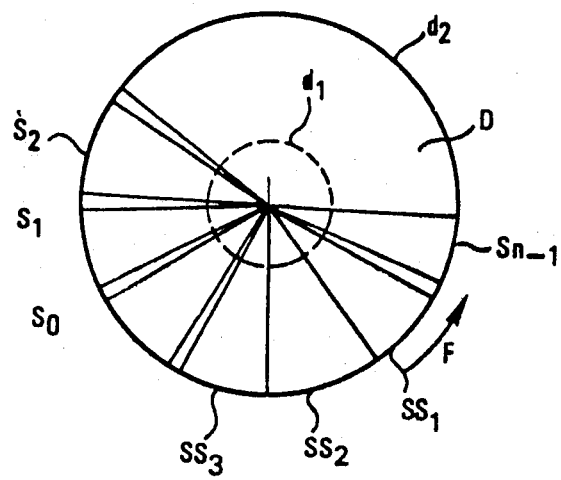
FIG.3a
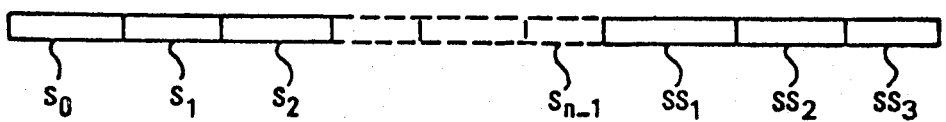
FIG.3            FIG.3b

FIG. 5

| DATA LINE | DOT LINE | I/O BUS STATE |
|---|---|---|
| 0 | 0 | READ DISC UNIT STATE (RS) |
| 0 | 1 | INTERPRET I/O SIGNAL AS COMMAND FOR 21 |
| 1 | 0 | READ DISC DATA (R) |
| 1 | 1 | WRITE DATA INTO DISC (W) |

FIG. 6

| I/O BUS LINE NO. | | | | | | | | CONTROL INSTRUCTION TO DISC UNIT |
|---|---|---|---|---|---|---|---|---|
| D1 | D2 | D3 | D4 | D5 | D6 | D7 | D8 | |
| 0 | T2 | T3 | T4 | T5 | T6 | T7 | T8 | TRACK SELECTION-PREPARE DISC TO GO TO READ OR WRITE MODE |
| 0 | 0 | N1 | N2 | D | H1 | T0 | T1 | TRACK SELECTION-NO. OF SECTORS TO BE LINKED TOGETHER-PREPARE DISC TO GO TO READ OR WRITE MODE |
| 0 | 0 | S0 | S1 | S2 | S3 | S4 | S5 | ACTIVATE SERVO CONTROL TO MOVE HEAD TO SELECTED TRACKS + SECTORS-USED ONLY IN READ MODE |
| 0 | 1 | S0 | S1 | S2 | S3 | S4 | S5 | ACTIVATE SERVO CONTROL TO MOVE HEAD TO SELECTED TRACKS + SECTORS-USED ONLY IN WRITE MODE |
| 1 | 0 | 0 | 1 | 0 | 0 | 0 | 0 | ERASE STATE BITS |
| 1 | 0 | 0 | 0 | 0 | 0 | 0 | 0 | RETURN LOGIC CONTROL UNIT TO ZERO |
| 1 | 0 | 1 | 0 | 0 | 0 | 0 | 0 | END OF OPERATION IN READ OR WRITE MODE |
| 1 | 1 | 0 | 0 | B6 | B7 | B8 | B9 | SELECT A WORD IN BUFFER BANK (4 LEAST SIGN. BITS [B6-B9]) |
| 1 | 1 | 1 | 0 | B2 | B3 | B4 | B5 | SELECT A WORD IN BUFFER BANK (BITS [B2-B5]) |
| 1 | 1 | 1 | 0 | 0 | 0 | B0 | B1 | SELECT A WORD IN BUFFER BANK (2 MOST SIGN. BITS [B0,B1]) |

FIG. 10  
| BSF | WCE | FLT | PER | RER | BSY | RDY | DAS |
|---|---|---|---|---|---|---|---|

APPARATUS FOR DETECTING FAULTY SECTORS AND FOR ALLOCATING REPLACEMENT SECTORS IN A MAGNETIC DISC MEMORY

FIELD OF THE INVENTION

The present invention relates generally to magnetic disc memory systems and more particularly to a magnetic disc memory system including apparatus for detecting faulty sectors and for allocating replacement sectors in the magnetic disc.

BACKGROUND OF THE INVENTION

Magnetic disc memories used in data processing systems have data recorded in binary coded form on concentric record tracks arranged on both faces of the disc. Generally, a data processing system includes a central unit for processing information (CPU) or data associated with peripheral members, such as printers, typewriters, magnetic tape units, disc memory units, etc.

In disc memories, there is associated with each disc face a single electro-magnetic transducer which can read data from and write data into only one track at a time. Therefore, to write or read data on a disc face, it is necessary for the transducer to be moved parallel to the disc face. To recover data recorded on the disc, the transducer is associated with electronic circuits which derive electrical pulses corresponding with recorded data that pass in front of the transducer. Electronic write circuits respond to electrical pulses to supply the transducer with data to be recorded on the part of the disc which passes in front of the transducer. The electrical pulses supplied to and read by the transducers generally have only two values, zero and one, and are usually referred to as logic signals or binary bits.

Data are distributed over a disc face in equal and adjacent sectors of a circle, so each sector includes two parts having different areas. The larger sector part contains recorded signal data to be handled by the central processing unit or peripheral devices, while the smaller sector part, termed a reference zone, carries track locating information. Generally, a disc face is divided into several tens of sectors. Tracks on the disc are assigned a serial number J, ranging from zero to (N-1) where N is the total number of record tracks and J is a whole number. The coded expression of a track serial number J is referred to as an address. Generally, the track serial numbers are recorded in binary code.

The present trend in disc memories is to increase data density. To increase data density, both the radial density, i.e., the number of recording tracks per unit length count along a disc radius, and longitudinal density, i.e., the number of bits per unit circumferential recording track length, are increased. As data density increases, the likelihood of faulty tracks on the disc increases so there is a non-zero probability of having faulty sectors.

Because of the non-zero probability of having faulty sectors, both faces of the disc are frequently provided with a number of additional tracks, termed "salvage" tracks which receive data that normally is contained in the faulty sectors. To avoid reading or writing data from or into a defective sector, the beginning of each track of a defective sector includes an information item which indicates whether or not the track is faulty, as well as an information item for the salvage track address, in the event of the track being faulty.

The prior art arrangement has the following consequences:
(1) the transducers must move from a faulty track to a salvage track, which is generally situated at the disc periphery;
(2) the fault handling arrangement must include at least one memory in which is recorded a fault table containing information relating to the faulty tracks; and
(3) the address information for the salvage track may be faulty.

These consequences give rise to the following disadvantages:
(1) the time required to access the salvage track, largely dependent on the time required for the transducer to move, is considerable compared with the time required for the magnetic transducer to transfer data when it is already positioned at the required track and sector;
(2) a microprogram generally having a complicated algorithm is required to manage the table;
(A) a microprogram is a fixed sequence of microinstructions which, while being executed, joins the various basic functions, which, together, represent a given function of an automatic data processing machine.
(3) if the salvage track address is faulty, the salvage track cannot be found and the data can be neither written into or read from the disc; and
(4) the salvage track address at the beginning of a track requires significant space on the disc surface.

BRIEF DESCRIPTION OF THE INVENTION

To overcome these advantages, the present invention provides an apparatus for enabling faulty sectors to be handled while data are being read from or written into the sectors. The faulty sector addresses are stored on the fly, and replacement sectors are handled sequentially at the end of the track.

More particularly, the apparatus in accordance with the present invention comprises a first means for writing data into and reading data from fault-free sectors, in combination with second means for detecting and identifying faulty sectors and third means for assigning replacement sectors equal in number to the number of detected faulty sectors.

The above and still further objects, features and advantages of the present invention will become apparent upon consideration of the following detailed description of one specific embodiment thereof, especially when taken in conjunction with the accompanying drawings.

BRIEF DESCRIPTION OF THE DRAWINGS

FIGS. 1a–1d are illustrations of how data are generally distributed on the surface of a magnetic disc utilized with the present invention;

FIG. 2 is an illustration of the format of an individual cell in a reference zone of the magnetic disc illustrated in FIG. 1;

FIGS. 3a and 3b are views of the complete sectors on a disc;

FIG. 5 is a truth table for all states which can be achieved using lines DATA and DOT in FIG. 4;

FIG. 6 is a table containing all control instructions which the disc memory unit must perform;

FIGS. 7, 8 and 9 are respectively illustrations of the formats of instruction bytes nos. 1, 2 and 3;

FIG. 10 is an illustration of the format of a state register utilized in the preferred embodiment of FIG. 4;

FIGS. 11, 12 and 13 are illustrations of the formats of bytes which enable addresses of the buffer register illustrated in FIG. 4a to be determined;

DETAILED DESCRIPTION OF THE DRAWING

Figure 4:
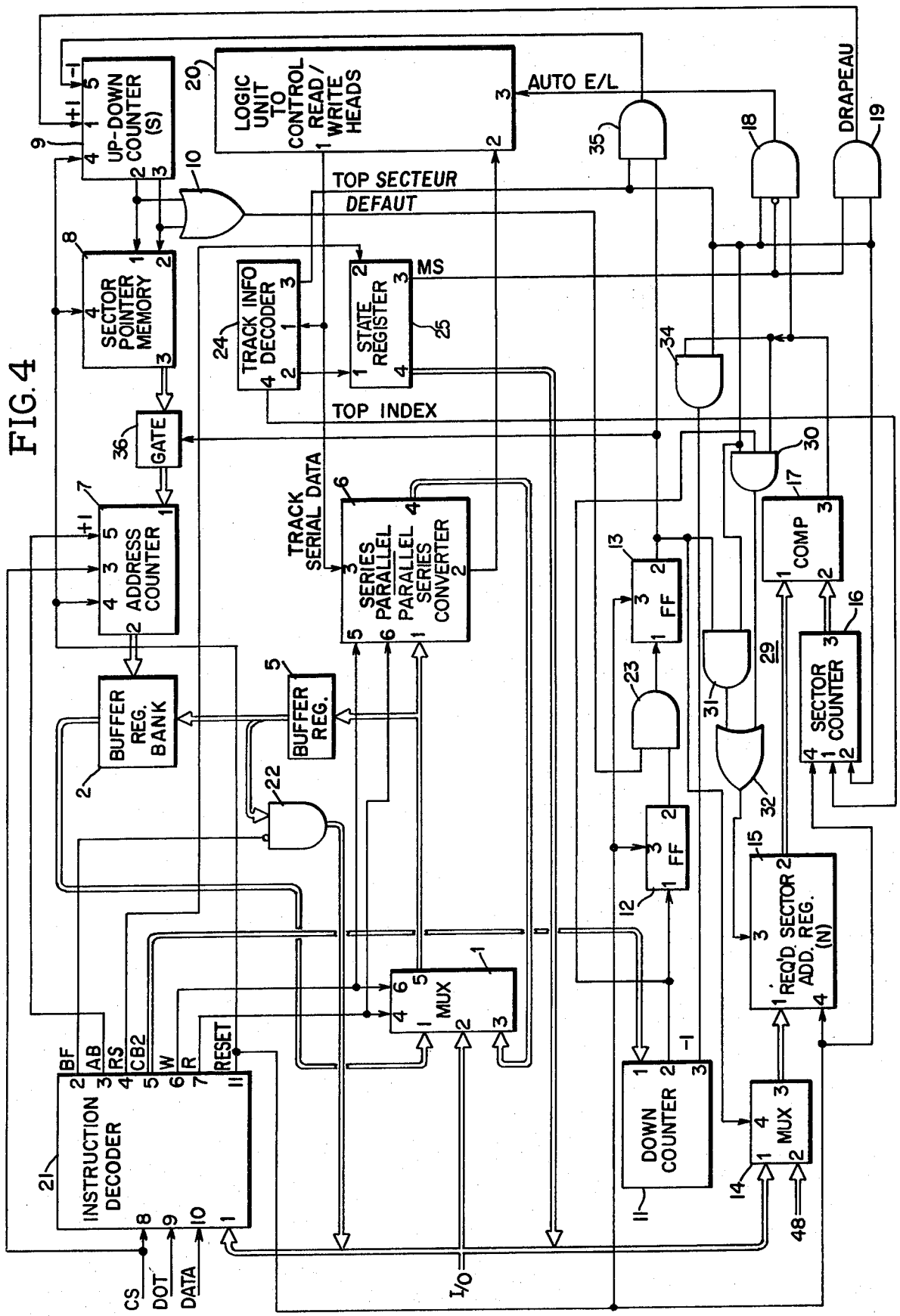
FIG. 4 is a circuit diagram of a preferred embodiment of the invention for salvaging faulty sectors.

In FIG. 1A is illustrated a magnetic disc D, rotating at constant angular velocity in the direction of arrow F, and having a useful recording area bounded by concentric circles d1 and d2. On disc D are defined N equal sectors s0 ... si ... sn of a circle.

As illustrated in FIG. 1B, each sector si is divided into two parts $SDO_i$ and $SDA_i$. In part $SDO_i$ are recorded the data to be processed by a data processing system of which the disc memory is a part. In part $SDA_i$ are recorded information for locating the tracks, namely track addresses and information required to servocontrol the position of magnetic transducer T to the center of each track, between track axes $A_{xj}$. The area part $SDA_i$ is much less than the area of part $SDO_i$.

FIGS. 1C and 1D are enlarged views of the $SDA_i$ part of sector $S_i$, contained within circle C. Each $SAD_i$ part of sector $S_i$ is divided into N reference position zones $ZRP_{i0}...ZRP_{ij}...ZRP_{i(N-1)}$, one for each track. To clarify the drawing, only the first five zones $ZRP_{i-0}$–$ZRP_{i4}$ are shown in FIGS. 1C and 1D, and are represented by rectangles. Boundaries between various zones $ZRP_{ij}$ are the circular axes $A_{xj}$ between adjacent magnetic tracks. Each magnetic track of member j and axis $A_{xj}$ is associated with a zone $ZRP_{ij}$. Thus, track 0 is associated with zone $ZRP_{i1}$, and so on.

Each zone $ZRP_{ij}$ contains a plurality of equal length individual cells, at least equal in number to the number of bits required to write the track address. An exemplary individual cell $C_k$ and parts of adjoining cells $C_{k-1}$ and $C_{k-2}$ in zone $ZRP_{ij}$ are shown in FIG. 2. Cell $C_k$ is divided into four equal parts $CP_1$, $CP_2$, $CP_3$ and $CP_4$; boundaries exist between adjacent parts $CP_1$ and $CP_2$ and $CP_3$, etc. Each cell $C_k$ contains two successive magnetic changes on the magnetic disc, as indicated by a double line in FIG. 2. In FIG. 2 are also indicated, for cell $C_k$, the magnetic induction polarity in each of parts $CP_1$ to $CP_4$, as well as the polarity of the first and last parts of cells $C_{k+1}$ and $C_{k-1}$, respectively. The two changes in magnetization polarity may occupy two positions; the first change may occupy either position P1, between parts $CP_1$ and $CP_2$, between parts $CP_2$ and $CP_3$; the second change may occupy either position P3, between parts $CP_3$ and $CP_4$, or position P4, between part $CP_4$ of cell $C_k$ and part $CP_1$ of cell $C_{k+1}$.

It is current practice for the majority of individual cells in zone $ZRP_{ij}$ to contain the information required to servocontrol the position of head T to the center of track j, as well as bits representing the track address. The information required to servocontrol the head to the center of the track and the address bits are respectively defined by the first change and the second change of each cell. If the changes occupy positions P1 or P3, the bit is equal to a binary or logic zero value, but if the changes occupy positions P2 or P4, the bit value is a binary one.

As indicated above, because magnetic discs have high lateral and longitudinal data densities, the probability of a disc sector containing a fault is not negligible. Hence, in addition to the N sectors $S_0$ to $S_{n-1}$ provided on both faces of disc D, each face includes additional, salvage sectors, as illustrated in FIG. 3.

The number of salvage sectors is generally a few units; in the illustrated embodiment, three such sectors SS1, SS2 and SS3 are provided. Sectors SS1, SS2 and SS3 are identical to sectors $S_0$–$S_{n-1}$, and therefore each salvage sector contains a reference zone for each of the N tracks.

Faults in a magnetic disc are located by checking operations performed on the disc by the manufacturer immediately after fabrication. The faulty sectors are thus known, as are the tracks within the sectors which the faults affect. To prevent any disruptions from occurring when data are read from a disc face by magnetic transducer T, it is necessary for each track segment contained in any sector on the face in question to write information indicating whether or not the segment contains a fault; if the sector contains a fault, it is impossible to write on or read from it. The fault indicating information is written in each reference zone in a cell, preferably a cell located at the beginning of the zone.

FIG. 4 is a circuit diagram of apparatus for salvaging faulty sectors in accordance with a preferred embodiment of the invention. Only the salvaging logic is illustrated in the figures. The other parts of the disc unit, which form no part of the present invention, such as the members for servocontrolling the read/write heads and the disc drive members, are not shown. Details of the construction of these members can be found, for example, in chapters 9 and 10 of the book entitled "Peripheral Devices" by Ivan Flores, published by Prentice-Hall, Englewood Cliffs, New Jersey, 1973.

The salvaging logic and interface member are connected between a central processing unit (not shown) and a logic unit 20 that controls the disc read/write heads. Exemplary logic units are disclosed in U.S. Pat. Nos. 3,641,524, 3,518,648 and 3,108,260. The salvaging logic and interface member illustrated in FIG. 4 is connected to information lines and control lines derived from the central processing unit (CPU) and to data read and data write signals coupled to the logic control unit 24 of the read/write heads of the magnetic disc memory. Information passes between the CPU and the magnetic disc memory unit along an input/output (I/O) bus. This information is typically data or instructions to control the various disc unit members.

In a preferred embodiment, the CPU has an eight parallel bit input/output bus. It is to be understood, however, that the principles of the invention are applicable to any number of bits in the input/output bus of the CPU. The CPU, in addition to having the I/O bus, includes three instruction output lines on which are respectively derived three binary output signals SD, DOT and DATA. The three binary instruction signals from the CPU are supplied to input terminals 8, 9 and 10 of instruction decoder 21, having output terminals 2-4, 6-7 and 11, as well as multi-bit output bus 5. Decoder 21 also includes eight parallel input terminals 1, each of which is responsive to the eight parallel bits on the eight parallel lines of bus I/O.

In a preferred embodiment, instruction decoder 21 is of a type described on pages 187 and 188 of the book "Structure AET Fonctionnement Des Ordinateurs" by Jean-Pierre Meinadier, published by Librairie La-Rousse, 17 rue de Montparnasse, Paris. In general, instruction decoder 21 responds to the signals at input terminals 8, 9 and 10 thereof, and the eight bits of the I/O bus applied to terminals 1 thereof to derive instructions for control of the remainder of the apparatus illustrated in FIG. 4, as well as to control whether data are to read from or written into the disc, or whether the state of the disc unit is to be read. In response to the DOT and DATA signals applied to terminals 9 and 10 respectively having values of 1 and 0, decoder 21 is activated to be responsive to the eight binary bits supplied in parallel to terminals 1 thereof. With decoder 21 so activated, binary signals are selectively derived from one of terminals 2-4, 6, 7 and 11, as well as bus 5, depending upon the status of the bits on bus I/O. A binary 1 level for signal BR at output terminal 2 of decoder 21 indicates that control is to be seized of a buffering operation within the apparatus of FIG. 4; a binary one signal AN, at terminal 3 of deconder 21 indicates that a 10 bit address counter is to be incremented by a count of one as described infra; a binary one RF signal at terminal 4 indicates that the state of the disc memory is to be read; signal CB2, derived from bus 5, indicates the number of sectors on the disc to be linked together; a binary one signal W, on terminal 6, indicates that data are to be written into the magnetic disc memory; a binary one signal R, on terminal 7, indicates that data are to be read from the magnetic disc memory; and a binary one signal on terminal 11 indicates that several counters, registers and memories in the system illustrated in FIG. 4 are to be reset.

Data are transmitted between the CPU and the apparatus illustrated in FIG. 4 along bus I/O in separate read and write modes. In the write mode, data are recorded on tracks of the magnetic disc, whereas in the read mode, data are read from a magnetic disc track and transmitted to the CPU via the I/O bus.

Data on the I/O bus are selectively supplied to the remainder of the apparatus illustrated in FIG. 4 via eight parallel input terminals 2 of multiplexer (MUX) 1. Multiplexer 1 includes two additional sets of eight parallel input terminals 1 and 3, as well as an eight bit parallel output, at terminals 5. Multiplexer 1 includes input control terminals 4 and 6, respectively responsive to the R and W signals derived from terminals 7 and 6 of decoder 21. Output terminals 5 are coupled to input terminals 1 in response to signals R and W, both being equal to zero; output terminals 5 are coupled to input terminals 2 in response to signals R and W being respectively equal to 0 and 1; output terminals 5 are coupled to input terminals 3 in response to signals R and W being respectively equal to 1 and 0.

To write signals into the magnetic memory that are derived from the CPU and coupled to the I/O bus, terminals 2 and 5 of multiplexer 1 are coupled together in response to signals R and W respectively having binary 0 and 1 values, whereby the eight bits on the I/O bus are coupled in parallel to eight input terminals 1 of buffer register 5 and into eight input terminals of series to parallel and parallel to series converter 6. Buffer register 5 includes eight parallel output terminals 2 which are applied in parallel to eight input terminals of inhibit gate 22 and input terminals 1 of addressable buffer register bank 2; each register in bank 2 has eight parallel output bits which are applied to input terminals 1 of multiplexer 1. In a preferred embodiment, there are four banks of 256 buffer registers included in register bank 2, with each buffer register including eight parallel bits. Data are selectively read into and out of selected buffer registers of buffer register bank 2 in response to 10 binary bits. The eight parallel data bits supplied by buffer register 5 to the eight parallel input bits of inhibit gate 22 are selectively fed through the inhibit gate in response to signal BF, at output terminal 2 of decoder 21, having a binary zero value. In response to signal BF having a binary zero value, the eight bits at the input of inhibit gate 22 are transferred to the I/O bus, and thence are coupled back to the CPU.

With the system in a write mode, the parallel data bits from the CPU are transferred from terminals 2 to terminals 5 of multiplexer 1, are in turn translated into an eight bit serial signal by series to parallel-parallel to series converter 6. To this end, converter 6 includes eight parallel input terminals 1 connected to the eight output terminals 5 of multiplexer 1. Converter 6 includes a serial output terminal 2 and control input terminals 5 and 6, respectively responsive to signals W and R derived from terminals 6 and 7 of decoder 21. In the write mode, signal W has a binary one level, causing converter 6 to be activated as a parallel to series converter so that the eight parallel bits at terminals 1 of the converter are converted into eight serial bits at output terminal 2 of the converter. With the system in a read mode, eight serial data bits coupled to terminal 3 of the converter are converted by the converter into an eight bit parallel output signals that is derived from eight parallel terminals 4 of the converter. To this end, signal R at terminal 7 of decoder 21 has a binary one level that is applied to input terminal 6 of converter 2. The eight parallel bits at terminals 4 are coupled to eight parallel input terminals 3 of multiplexer 1 by a suitable bit.

Decoder 21 thus controls multiplexer 1, register banks 2, converter 6, and gate 22 to enable data to be transferred between the CPU and the disc unit, as well as to enable the data to be buffered, in both the read and write modes. Buffer registers 2 are addressed by 10 bit address counter 7, having an increment input terminal 5 responsive to signal CS, derived from the CPU. Address counter 7 includes an enable input terminal 3, responsive to binary 1 level for signal AB, at output terminal 3 of decoder 21, as well as a reset input terminal 4 responsive to a binary 1 reset signal derived from output terminal 11 of the decoder.

At the beginning of a salvaging operation, the two most significant bit stages of counter 7 are preloaded with any of the values 00, 01, 10 or 11, depending upon the number of sectors to be salvaged. To this end sector pointer memory 8 and up-down counter 9 are provided which store an indication of the number of sectors to be salvaged. Memory 8 and up-down counter 9 are both provided with input terminals 4, responsive to the reset signal derived from output terminal 11 of decoder 21. Memory 8 has the capability of storing two binary bits, while counter 9 is capable of counting from the binary number 00 to the binary number 11, i.e., from the decimal number 0 to the decimal number 3. Counter 9 includes two output terminals 2 and 3 on which are derived a two bit parallel binary signal signal indicative of the count of the counter; terminals 2 and 3 of counter 9 supply the binary bits to input terminals 1 and 2 of sector pointer memory 8. Sector pointer memory 8 includes two output terminals 3 on which are derived parallel bits indicative of the count stored in the memory. At the beginning of a salvage operation the binary bits at output terminals 3 of memory 8 are applied through gate 36 to a pair of input terminals 1 of address counter 7, to load the two most significant bit positions of the address counter. The manner in which gate 36 is selectively enabled, at the beginning of a salvaging operation, is described infra.

Up-down counter 9 is also provided with increment input terminal 1 and decrement input terminal 5 which respectively advance and reduce the count stored in counter 9 by a count of one in response to binary 1 signals being applied thereto. Increment input terminal 1 of counter 9 is supplied with a binary 1 signal by the output of AND gate 19 which indicates that a fault flag has been detected. The fault flag is detected by AND gate 19 in response to signal MS, at output terminal 3 of state register 25, having a binary 1 level to indicate that a selected sector is defective. In addition, AND gate 19 is responsive to signal TOP SECTEUR derived from output terminal 3 of track information decoder 24, having a binary 1 value to indicate that a sector mark has been detected. Track information decoder 24 responds to the output of logic unit 20 to indicate that the beginning of a sector has been detected, to enable the sector mark signal to be derived. A decrementing, binary 1 signal is supplied to terminal 5 of up-down counter 9 when salvaging is to be performed and no sectors are to be linked together, and when the beginning of a sector has been detected. To this end, signal TOP SECTEUR derived from output terminal 3 of track information decoder 24, is combined with the signal at output terminal 2 of flip-flop 12 in AND gate 35, having an output that is coupled to input terminal 5 of counter 9. As described infra, flip-flop 13 is activated to a set state, so that a binary 1 signal is derived from output terminal 2 thereof, when no sectors are to be linked together and there are sectors to be salvaged.

Registers 24 and 25 cooperate with each other and output signals of decoder 21 and logic unit 20 to enable signal MS to be derived and to enable an 8-bit parallel word indicative of the operating state of the system to be supplied to the CPU via bus I/O. To this end, track information decoder 24 includes an input terminal 1 responsive to serial data from the disc track, as derived from output terminal 1 of logic unit 22. In response to the signal applied to terminal 1, track information decoder 24 derives output signals on terminals 2, 3 and 4 thereof. On terminal 2 is derived a signal that is indicative of state information from the disc which is supplied to state register 24 where it is formated in the manner illustrated by FIG. 10, as described infra. The formated data is supplied to output terminals 4 which are connected to bus I/O. At output terminal 3 of track information decoder 24 is derived signal TOP SECTEUR which indicates that the beginning of a sector has been detected. At output terminal 4 of track information decoder 24 is derived signal TOP INDEX, an index mark signal which has a binary 1 value to indicate that the first track and sector on the disc has been detected. Register 25 includes output terminal 3 on which is derived signal MS, which indicates that the sector selected by logic unit 20 is defective. State register 25 includes input terminal 2 responsive to signal RS at output terminal 4 of decoder 21; a binary 1 value for signal RS enables the state register to be responsive to the state information supplied to it by decoder 3. State register 25 also contains a reset input terminal 5 responsive to the reset signal at terminal 11 of decoder 21.

To control read in and read out of data from the correct sectors of the disc, the address of the sector being read from or written into the disc is counted and stored in counter 16, typically an 8-stage counter having an input increment terminal 2 and an 8-bit parallel output bus at terminals 3. Increment terminal 2 of counter 16 is responsive to signal TOP SECTEUR, as derived from output terminal 3 of track information decoder 24. Signal TOP SECTEUR is derived each time that a different sector is read from the disc memory. Counter 16 includes a reset to zero input terminal 1 responsive to signal TOP INDEX, as derived from output terminal 4 of track information decoder 24, when the initial disc track and sector are encountered. Counter 16 also includes a reset to zero input terminal 4 responsive to the reset signal derived by decoder 21 and output terminal 11 thereof.

The address of the sector of the disc memory from which data are to be read or into which data are to be written (the required sector) is stored in 8-bit address register 15. Address register 15 includes 8 input terminals 1 which are supplied with an 8-bit parallel signal from output terminals 3 of multiplexer 14. Multiplexer 14 includes a control input terminal 4 responsive to the signal at output terminal 2 of flip-flop 13. In response to flip-flop 13 being set, to indicate that no sectors are to be linked and there are sectors to be salvaged, a fixed, pre-wired address or the initial salvage sector is coupled from input terminals 2 of multiplexer 14 to output terminals 3 thereof. In the preferred embodiment, the fixed, pre-wired address for the initial salvage sector is 48. If, however, no salvaging is to be performed, or if there are one or more sectors that must be linked together, a binary 0 is derived from flip-flop 13 and is applied to input terminal 4 of multiplexer 14 causes the address on bus I/O to be coupled from eight parallel input terminals 1 of the multiplexer to output terminals 3 of the multiplexer. Address register 15 includes an increment input terminal 3 responsive to binary output signals of logic network 29, described in detail infra. In addition, address register 15 includes a reset input terminal 4 responsive to the reset signal derived from output terminal 11 of decoder 21.

The 8-bit address signals stored in registers 15 and 16, respectively indicating the addresses for the required and actual sectors, are applied to input terminals 1 and 2 of comparator 17. In response to the signals applied to terminals 1 and 2 and comparator 17 being the same, a binary 1 signal is derived by the comparator 17 on output terminal 3 thereof. Hence, a binary 1 signal is derived by comparator 17 when only the actual and required sector addresses are the same.

The binary 1 output signal of comparator 17 is applied to one input of AND gate 18 having a second input responsive to the sector mark signal TOP SECTEUR. AND gate 18 includes an inverting input terminal responsive to signal MS as derived from output terminal 3 of state register 25. AND gate 18 responds to the output of comparator 17, signal TOP SECTEUR and signal MS to derive a binary 1 signal when the actual and required sector addresses are the same and when the beginning of a sector is encountered, but not when the selected sector has been found to be defective. The binary 1 output of AND gate 18 is applied as signal AUTO E/L to input terminal 3 of logic unit 20 to authorize read and write operations for the control heads of the magnetic disc memory.

To keep track of the number of sectors to be linked together, down counter 11 is provided. Down counter 11 includes a multi-bit parallel set of load input terminals 1 responsive to the parallel signal bits CB2, derived from output terminal 5 of decoder 21. Signal CB2 loads down counter 11 with a count indicative of the number of sectors to be linked together, as coupled to the apparatus of FIG. 4 by bus I/O from the CPU. Counter 11 includes a decrement input terminal 3 which, when supplied with a binary 1 signal, causes the count stored in counter 11 to be decreased by a count of 1. Decrement input terminal 3 is supplied with a binary 1 signal each time the beginning of a sector is encountered by the heads of the magnetic disc memory that has the same address as a required sector. To this end, the output of comparator 17 is combined with the sector mark signal TOP SECTEUR in AND gate 34, the output of which is coupled to decrement input terminal 3 of down counter 11. Down counter 11 includes an output terminal 2 on which is derived a binary 1 signal whenever the counter has reached a counter of zero, to indicate that linkage has been performed. The binary 1 signal derived from output terminal 2 of counter 11 is supplied to input terminal 1 of flip-flop 12, where it is stored until the flip-flop is reset in response to the reset output signal of decoder 21 at terminal 11 thereof.

In response to a binary 1 signal being applied to input terminal 1 of flip-flop 12, the flip-flop is activated to a set state, causing a binary 1 signal to be derived from output terminal 2 thereof. The linkage indication stored in flip-flop 12 is combined with an indication of whether there are sectors to be salvaged. To determine if there are sectors to be salvaged, the signals at output terminals 2 and 3 of counter 9 are combined in OR gate 10. In response to a count other than 0 being stored in counter 9, OR gate 10 derives a binary 1 output signal DEFAUT. The signal at output terminal 2 of flip-flop 12 is combined with signal DEFAUT in AND gate 23, having an output which is applied to input terminal 1 of flip-flop 13, having a reset input terminal 3 responsive to the reset signal derived from output terminal 11 of decoder 21. Flip-flop 13 responds to the output of AND gate 23 so a binary 1 level is derived at output terminal 2 of the flip-flop when no sectors are to be linked together and there are sectors to be salvaged. As indicated supra, the leading edge of the binary 1 signal at output terminal 2 of flip-flop 13 is applied as an enable input to gate 36 so the count stored in memory 8 can be coupled to the two most significant bit stages of address counter 7. Terminal 4 of multiplexer 14 is also responsive to the signal at output terminal 2 of flip-flop 13 to control whether the address on bus I/O or the fixed, pre-wired address for the salvage sector is to be coupled to address register 15.

Logic network 29, which supplies binary 1 signals to the increment input terminal 3 of address register 15, includes AND gates 30 and 31, as well as OR gate 32. AND gate 30 has three inputs, respectively responsive to the sector mark signal TOP SECTEUR, the output of comparator 3, and the output of down counter 2. The output of AND gate 30 is supplied through OR gate 32 to increment input terminal 3 of register 15. The other input to OR gate 32 is responsive to the output of AND gate 31, having a first input responsive to the signal at output terminal 2 of flip-flop 13 and a second input responsive to the sector mark signal TOP SECTEUR. The increment terminal of address register 15 is thereby supplied with a binary 1 signal in response to either of the following conditions: (1) no sectors to be linked, and a number, other than 0, of sectors to be salvaged at the beginning of a sector, or (2) no sectors to be linked and the address of the required sectors being equal to the address of the sector into which data are to be written or from which data are to be read at the beginning of the sector.

In the preferred embodiment, the elements of FIG. 4 are integrated circuits. Circuits which can be utilized for the apparatus of FIG. 4 are described in the book entitled "The TTL Data Book for Design Engineers," edited by Texas Instruments, Copyright 1973. For example, the preferred circuit for the multiplexers is an SN 74150 chip, the bank of registers is an SN 74198 chip, the serial to parallel-parallel to serial converter is an SN 74164 chip, the counters are SN 74196 chips and the flip-flops are SN 74S112 chips.

Reference is now made to the chart of FIG. 5 which represents the condition of bus I/O in response to four different combinations of signals DATA and DOT, as applied to terminals 9 and 10 of decoder 21. In response to signals DATA and DOT both having binary 0 values, as indicated by line 1, FIG. 5, signal RS at output terminal 4 of the decoder has a binary 1 level which is applied to input terminal 2 of state register 25 to enable the state of the disc unit to be read. In response to signals DATA and DOT respectively having values of 0 and 1, decoder 21 is activated to interpret the signals on bus I/O as command signals for the decoder, to enable binary 1 signals to be derived by the decoder at output terminals 2 and 3 thereof, and to enable a multi-bit signal to be derived at the decoder output terminal 5 to indicate the number of sectors to be linked together. In response to signals DATA and DOT respectively having values of 1 and 0, decoder 21 is activated so that signal R, at output terminal 7 of the decoder, has a binary 1 level to enable data to be read from the disc of the memory. In response to signals DATA and DOT both having binary 1 values, decoder 21 is activated so that signal W at output terminal 6 of the decoder has a binary 1 value to command data to be written into the disc memory. The binary 1 values of signal R are applied as control signals to input terminals 4 and 6 of register 1 and input terminals 5 and 6 of converter 6.

Reference is now made to FIG. 6 of the drawing wherein there is illustrated a chart indicating the binary values for bits D1–D8 of bus I/O and the resulting control instructions which are supplied to the disc memory.

The eight bit words coded on lines 1 and 2 of FIG. 6 are illustrated in greater detail in FIGS. 7 and 8 and make selection of the tracks and discs used in conjunction with control signals DATA and DOT to prepare the disc unit to go into the read or write mode. To these ends, the least significant bit position D1 of the signal on line 1 (FIG. 6) and the two least significant bit positions (D1, D2) of the signal on line 2 (FIG. 6) have binary zero values. Bits D2 and D8 of the signal on line 1 represent the seven least significant bits T2–T8 of the selected track address, and bits D7 and D8 of line 2 represent the two most significant bits T0 and T1 of the selected track address. Bits D3 and D4 of line 2 indicate the number of sectors to be linked together, a number that can vary between the binary values 00–11, i.e., decimal values 0–3. Line 2, bit D5, indicates the disc, i.e., 0 or 1, bit face. Bit D6 of line 2 has no significance.

The codes of lines 3 and 4, illustrated in greater detail in FIG. 9, enable the servocontroller to move the head to the track address selected by the signals of lines 1 and 2 and to sectors within the track; the signal of line 3 is utilized in the read mode while the signal of line 4 is employed in the write mode. To these ends, bits D1 and D2 of line 3 are 00, while bits D1 and D2 of line 4 are 01. Bits D1 and D2 of lines 3 and 4 are respectively derived in response to signals DOT and DATA applied by the CPU to input terminals 9 and 10 of decoder 21. Bits D3–D8 of lines 3 and 4 (S0–S5) are six bits representing the value, i.e., address of the sector to which the head is to be moved and are supplied by the CPU to the input/output bus.

Lines 5–7, FIG. 6, indicate codes used to control various operations and registers in FIG. 4. Code 1001000 of line 5 indicates that the state bits stored in register 25 are to be erased. Code 10000000 on line 6 indicates that control unit 20 is to be returned to the zero, i.e., initial state, while bits 10100000 on line 7 indicate the end of an operation in the read or write mode.

The words of FIG. 6, lines 8, 9 and 10, respectively illustrated in detail in FIGS. 11–13, enable an eight bit word to be read from or into a particular register in buffr register bank 2. Ten address bits are required to select, i.e., address, a register from buffer register bank 2 because the bank includes 1024 such registers. The four least significant address bits of the selected buffer register of bank 2 are indicated by bit positions D5–D8 on line 8 as bits B6 ∝ B9 while the next four least significant bits (B2–B5) of the selected address in bank 2 are indicated by bit positions D5–D8 on line 9; the two most significant bits (B0,B1) of the address for the selected buffer register are indicated by bit positions D7 and D8 in the word on line 10. A line 8 (FIG. 11) word is specified by bits D1, D2, D3 and D4, respectively having values of 1100. A line 9 (FIG. 12) word is indicated by bits D1–D4 having values of 1110 and a line 10 (FIG. 13) word is specified by bits D1, D2, D3, D4, D5 and D6, respectively having values of 111100.

The signals of lines 1 and 2 always occur in sequence, with the eight bits of line 1 being applied initially to the input/output bus by the CPU; subsequently, during the next time interval of the CPU, the eight bits of line 2 are applied by the CPU to the input/output bus. The signals of lines 3–7 can be derived in any random order by the CPU and applied to inputs of decoder 21. The signals of lines 8–10 are derived in sequence during three successive operating cycles of the CPU and are applied by the CPU to the input/outbus bus.

In FIG. 10 is illustrated the format of eight bit state register 25. A binary 1 in stage 1 of state register 25 indicates that the sector on a disc which has been located is defective, i.e., signal BSF has a binary 1 value. A binary 1 signal in the second stage of register 25 indicates that the number of sectors to be written into the disc exceeds the normal disc capacity (WCE=1). A binary 1 signal in the third stage of register 25 indicates that there is a fault in some part of the disc unit (FLT=1). A binary 1 in the fourth stage of the state register 25 indicates that there is a parity error in the sector address, as indicated by the address data bits written or read from the sector (PER=1). A binary 1 in the fifth stage of the register indicates that there is a read error (RER=1). A binary 1 in the sixth stage of register 25 indicates that the disc unit is busy (BSY=1). A binary 1 in the seventh stage of register 25 indicates that the disc unit is ready to receive or transmit information (RDY=1). A binary 1 value in the eighth stage of address register 25 indicates that the disc unit is operating (DAS=1).

Figure 14B:
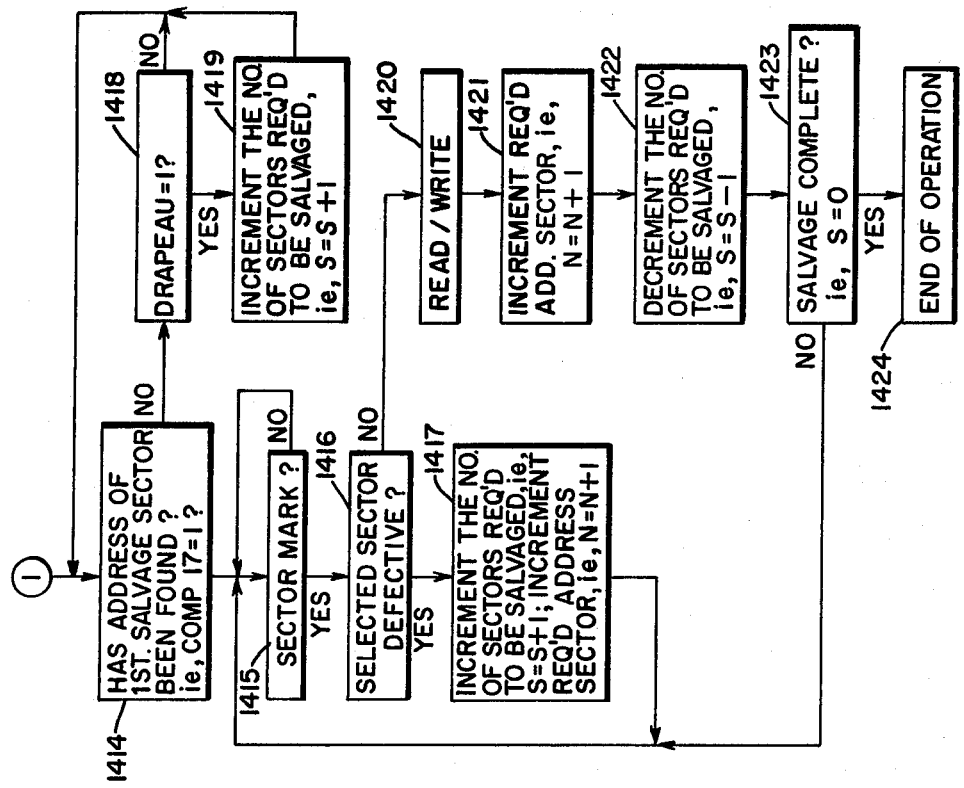
FIGS. 14a and 14b are flow charts for the operation of the apparatus shown in FIG. 4.
Figure 14A:
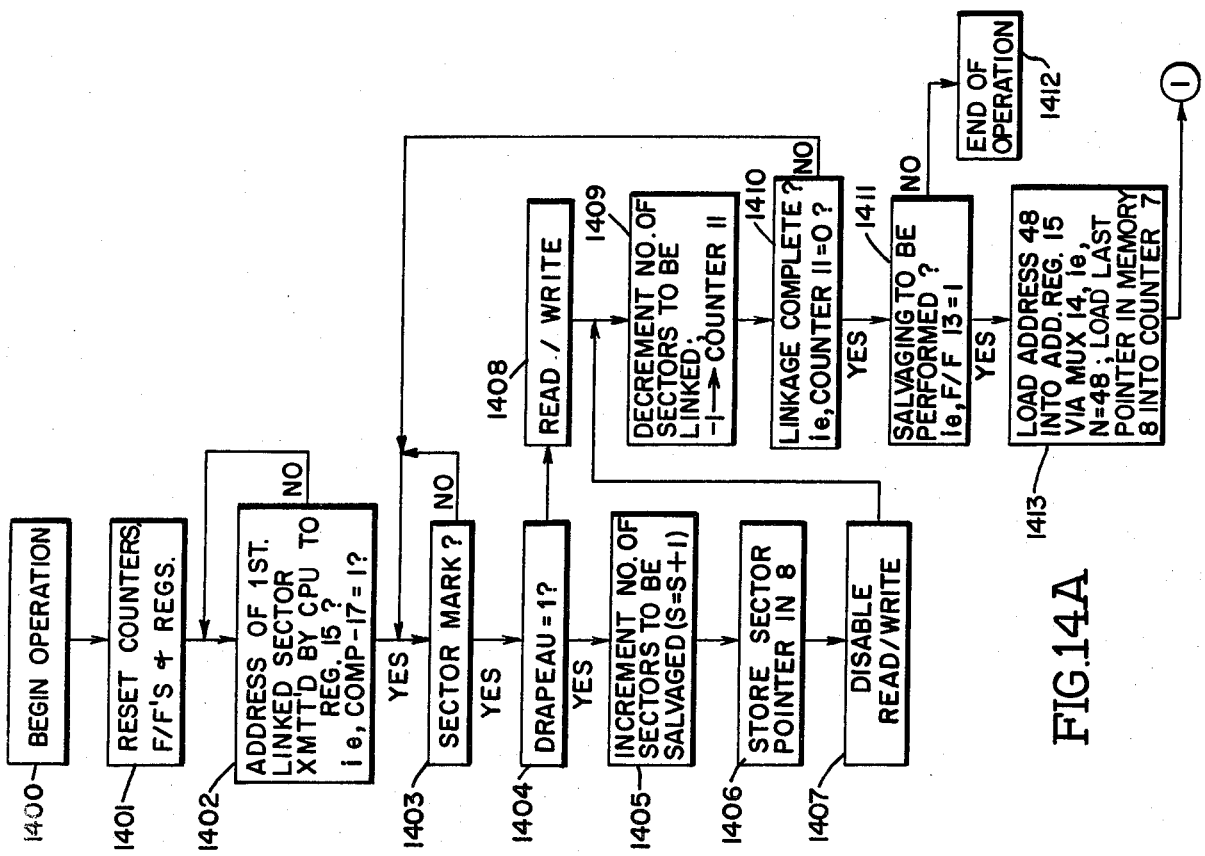

Reference is now made to FIGS. 14A and 14B, flow charts of the operation of the apparatus illustrated in FIG. 4. The beginning of an operation performed by the apparatus of FIG. 4 is indicated by operation 1400. In response to the beginning of an operation being flagged, the system is activated to operation 1401, during which a reset signal, derived by decoder 21 on terminal 11, is applied as a reset input to each of flip-flop 12, address register 15, sector counter 16, address counter 7, sector pointer memory 8 and sector counter 9. In addition, a multi-bit signal is supplied by instruction decoder 21 to input terminals 1 of counter 11 to indicate the number of sectors to be linked together.

The address of a first linked sector is now supplied, during operation 1402, by the CPU to address register 15 via input 1 of multiplexer 14. During operation 1402, comparator 17 responds to the address for the required sector stored in register 15 and the address of the actual sector being read, as stored in counter 16. If comparator 17 determines that the address stored in register 15 differs from the address stored in counter 16, the system does nothing further until a new first linked sector is transmitted by the CPU through multiplexer 14 to register 15.

In response to comparator 17 indicating that the address of the first linked sector supplied to address register 15 is the same as the actual sector being read, a determination is made during operation 1403 of whether or not a sector mark signal TOP SECTEUR (derived at the beginning of each sector) is being derived at output terminal 3 of track information decoder 24. The system stays in a quiescent state until a signal TOP SECTEUR is supplied to AND gates 18 and 19; operation 1403. While signal TOP SECTEUR is being supplied to AND gates 18 and 19, a determination is made as to whether a faulty sector flag is set, as indicated by a binary 1 value of signal MS at output terminal 3 of register 25; operation 1404. A binary 1 output of AND gate 19, indicating that the faulty sector flag has been set, is applied to the increment input terminal 1 of counter 9 to advance the counter state by one; operation 1405. The state of counter 9 is transferred to sector pointer memory 8 during operation 1406 by virtue of the connections between the outputs of counter 9 and input terminals 1 and 2 of memory 8. At this time the output of AND gate 18 is a binary zero value because signal MS is coupled to the inverting input terminal 4 of the AND gate; operation 1407.

If the faulty sector flag is not set during operation 1404, the program advances to operation 1408, during which a binary 1 level is derived from AND gate 18. The binary 1 output of AND gate 18 is supplied to logic unit 20 to authorize a read/write operation for the disc unit heads controlled by the logic unit. When either operation 1407 or 1408 is performed, the number of sectors to be linked together as stored in counter 11 is decremented during operation 1409 by combining the output of comparator 17 and the sector mark signal TOP SECTEUR in AND gate 35 having an output coupled to decrement input terminal 3 of counter 11.

If the outputof AND gate 34 causes counter 11 to return to a count of zero, to indicate linkage has been completed, a binary 1 signal is derived on output terminal 2 of the counter; operation 1410. If linkage has not been completed, whereby a binary zero is derived on ouput terminal 2 of counter 11, the system waits for the next sector mark signal and thereby returns to operation 1403. If, however, linkage has been completed, a determination of whether salvaging is to be performed occurs during operation 1411. In operation 1411, flip-flop 12 is activated to the set state in response to the binary 1 output of counter 11 being applied to input terminal 1 of flip-flop 12 which causes a binary 1 signal to be derived at terminal 2. The signal at output terminal 2 of flip-flop 12 is combined in AND gate 23 with signal DEFAUT derived from OR gate 10. If signal DEFAUT has a binary zero value, the output of AND gate 23 is a binary zero level and no salvaging is to be performed, resulting in termination of the operation of the apparatus illustrated in FIG. 4; operation 1412. If, however, signal DEFAUT has a binary 1 level, AND gate 23 derives a binary 1 signal which is applied to input terminal 1 of flip-flop 13, causing the flip-flop to be set to indicate that salvaging operation 1413 is to be performed. With flip-flop 13 activated to the set condition, a binary 1 level derived from output terminal 2 thereof is supplied to input terminal 4 of multiplexer 14. The binary 1 signal applied to input terminal 4 of multiplexer 14 causes ouput terminals 3 of the multiplexer to be responsive to the fixed, pre-wired initial address of salvaged sectors (sector 48) as coupled to input terminal 2 of the multiplexer. Simultaneously, address counter 7 is enabled to be responsive to the contents of sector pointer memory 8, whereby the last pointer stored in memory 8 is loaded into the address counter, a result achieved by supplying the signal at output terminal 2 of flip-flop 13 to an enable input of gate 36, having data inputs responsive to the 2 bit output of memory 8. The enable input of gate 36 is responsive only to the leading edge of the output of flip-flop 13.

Consideration is now given to the operations performed during a salvage operation, as occurs after operation 1413 has been completed and flip-flop 13 has been set so that a binary 1 level is derived from output terminal 2 thereof. Address 48, the pre-wired address for the salvage sector, is loaded into address register 15 via multiplexer 14 and is continuously compared with the address of the sector actually being read, as derived from sector counter 16. Such a comparison is performed in comparator 17; operation 1414. In response to the addresses in register 15 and counter 16 being the same, comparator 17 derives a binary 1 signal, causing the apparatus of FIG. 4 to proceed to operation 1415. In operation 1415, the system waits until a sector mark signal is detected and derived as a binary 1 on output terminal 3 of track information decoder 24. In response to the sector mark signal being derived, the apparatus advances to operation 1416, at which time a determination is made as to whether a fault flag has been detected in the salvage zone. An indication of a fault flag having been detected in the salvage zone is derived by AND gate 19 in response to signal MS at output terminal 3 of state register 25 and the sector mark signal derived from output terminal 3 of track information decoder 24 both having binary 1 levels. The binary output of AND gate 19 is applied to increment input 1 of sector counter 9 to provide an indication that one of the salvage sectors was defective and to instruct the system to address to a higher numbered salvage sector; operation 1417. After operation 1417 has been completed, the system again looks for sector mark signals and operation 1415 is repeated.

If, during operation 1416, no fault flag is detected, a binary 1 signal is derived from AND gate 18 and is applied to logic control unit 20 to authorize a read/write operation for the heads, as indicated by operation 1420. Simultaneously, binary 1 signals are derived from AND gates 30 and 34. The binary one output signal of AND gate 34 is coupled to decrement input terminal 3 of counter 11, but has no effect on the counter because the counter is at a count of zero and cannot be decremented to a lower count. The binary 1 output of AND gate 30 is coupled through OR gate 32 to increment input terminal 3 of required sector address register 15, as indicated by operation 1421. Thereby, when the next sector mark is detected, to advance the count of counter 16, a binary 1 is again derived from comparator 17 so the operations can be repeated for the next sector.

As long as flip-flop 13 is activated to a set state, to indicate that salvaging is to be performed and no fault flag is detected, each detected sector mark causes the number of sectors to be saved to be decremented by a count of one: operation 1422. Operation 1422 is performed by combining the sector mark signal and the output of flip-flop 13 in AND gate 35, having an output supplied to decrement input terminal 5 of counter 9. Decrementing counter 9 changes the address read from buffer registers 2. If, as a result of the decrementing operation, counter 9 returns to a zero state, a binary zero signal is derived from output terminal 3 of OR gate 10 and the system is advised that there are no additional faulty sectors to be considered; operation 1423. In response to the values stored in counter 9 having a value of zero, the operation of the system is terminated, operation 1424. If, however, there are still salvaging operations to be performed, because a number other than zero is stored in counter 9, the system continues to look for sector marks and returns to operation 1415.

It is possible for faults to occur between the end of a linked sequence and the beginning of a salvage zone, i.e., between the time the fixed, pre-wired address for the salvage sector is loaded into address register 15 and when the salvage sector address is reached by counter 16. If such a fault occurs, a binary 1 signal is derived from AND gate 19; operation 1418. In response to the binary 1 output of AND gate 19, a signal is applied to increment input terminal 1 of counter 9 to advance the state of the counter by one; operation 1419. Upon the completion of operation 1419, or if no fault flag is detected during operation 1418, the system returns to or remains in operation 1414, respectively.

Figure 15A:
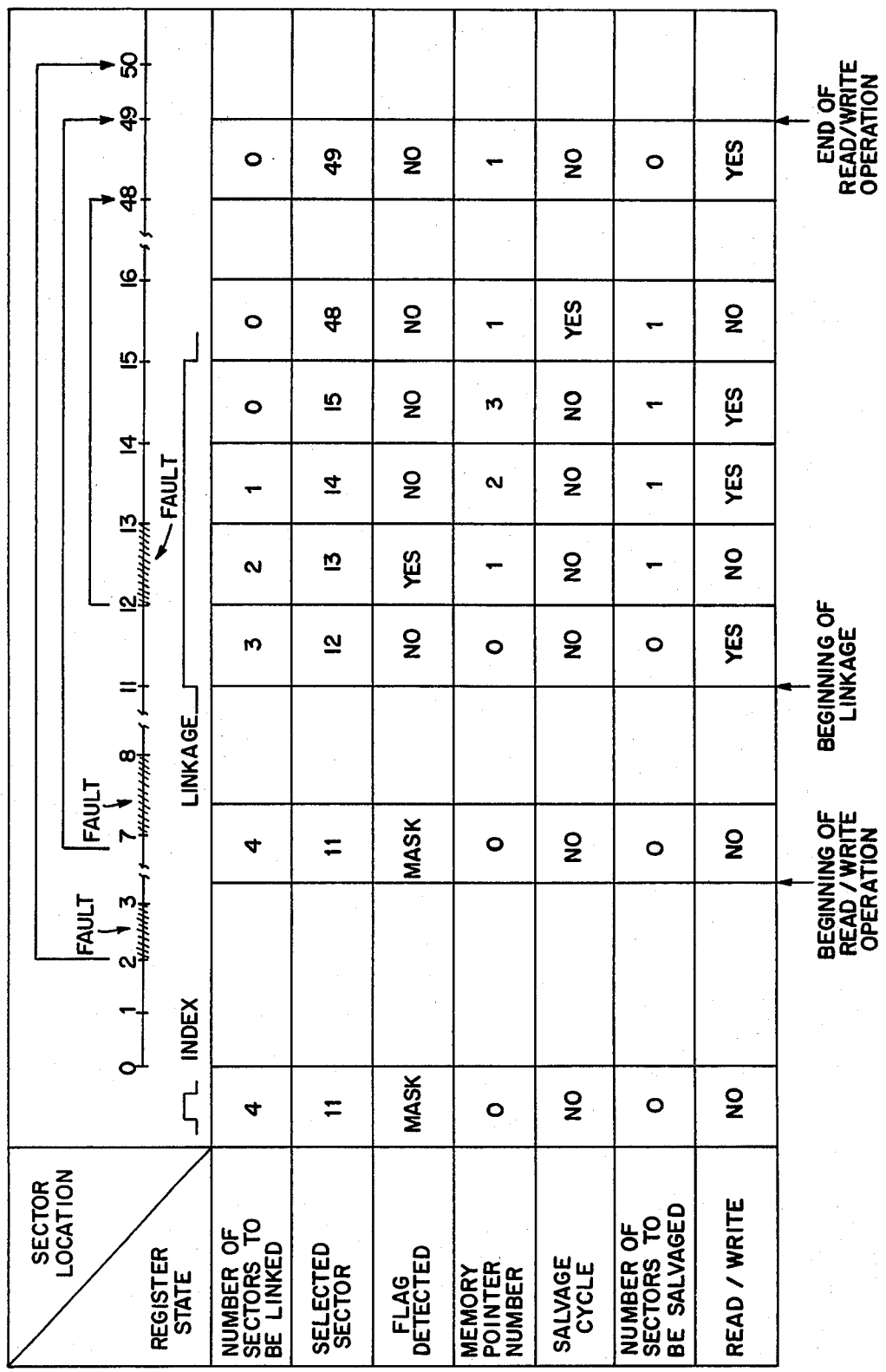
FIGS. 15a, 15b, and 15c are illustrations of various examples of the operation of the apparatus of FIG. 4.
Figure 15B:
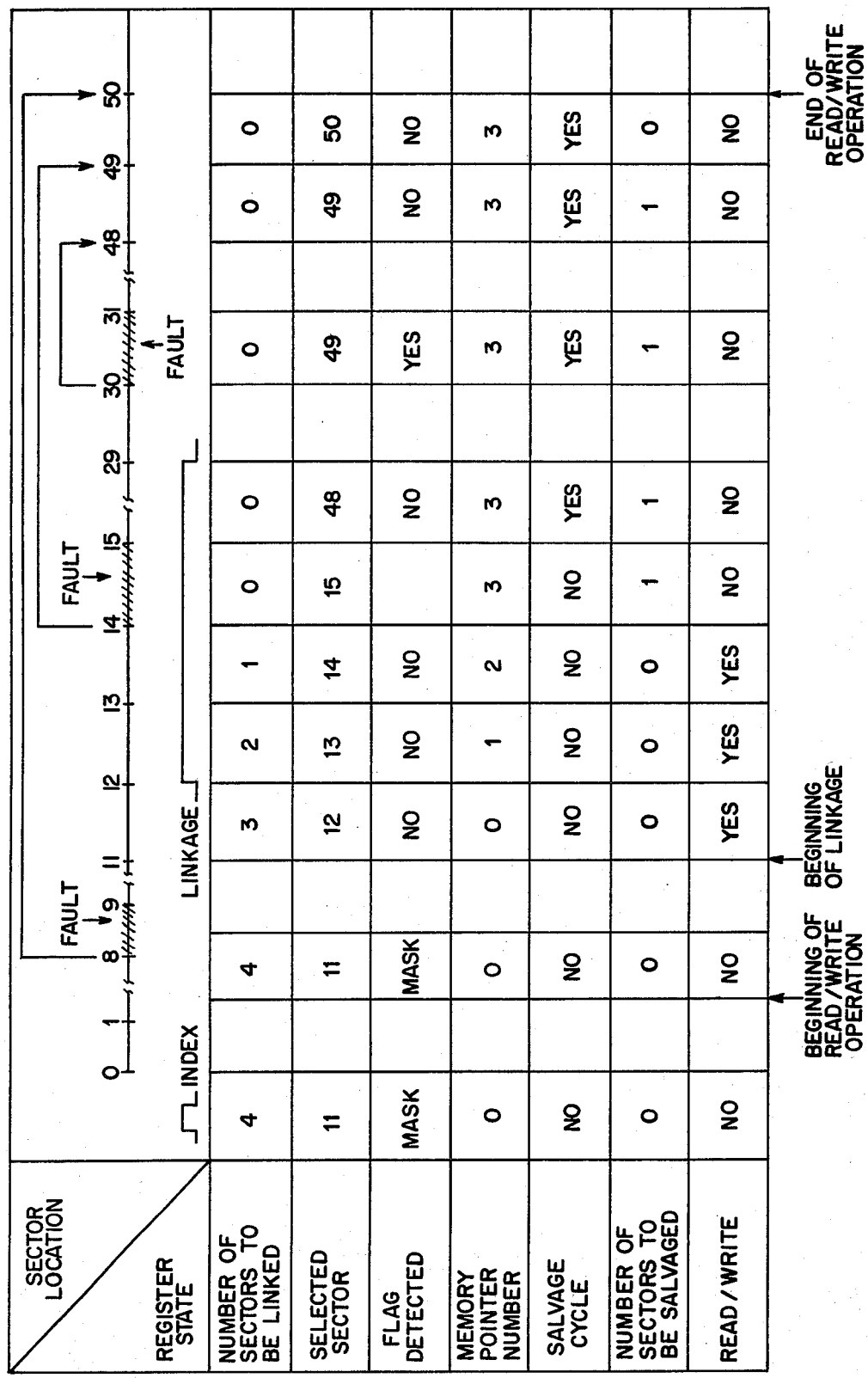
Figure 15C:
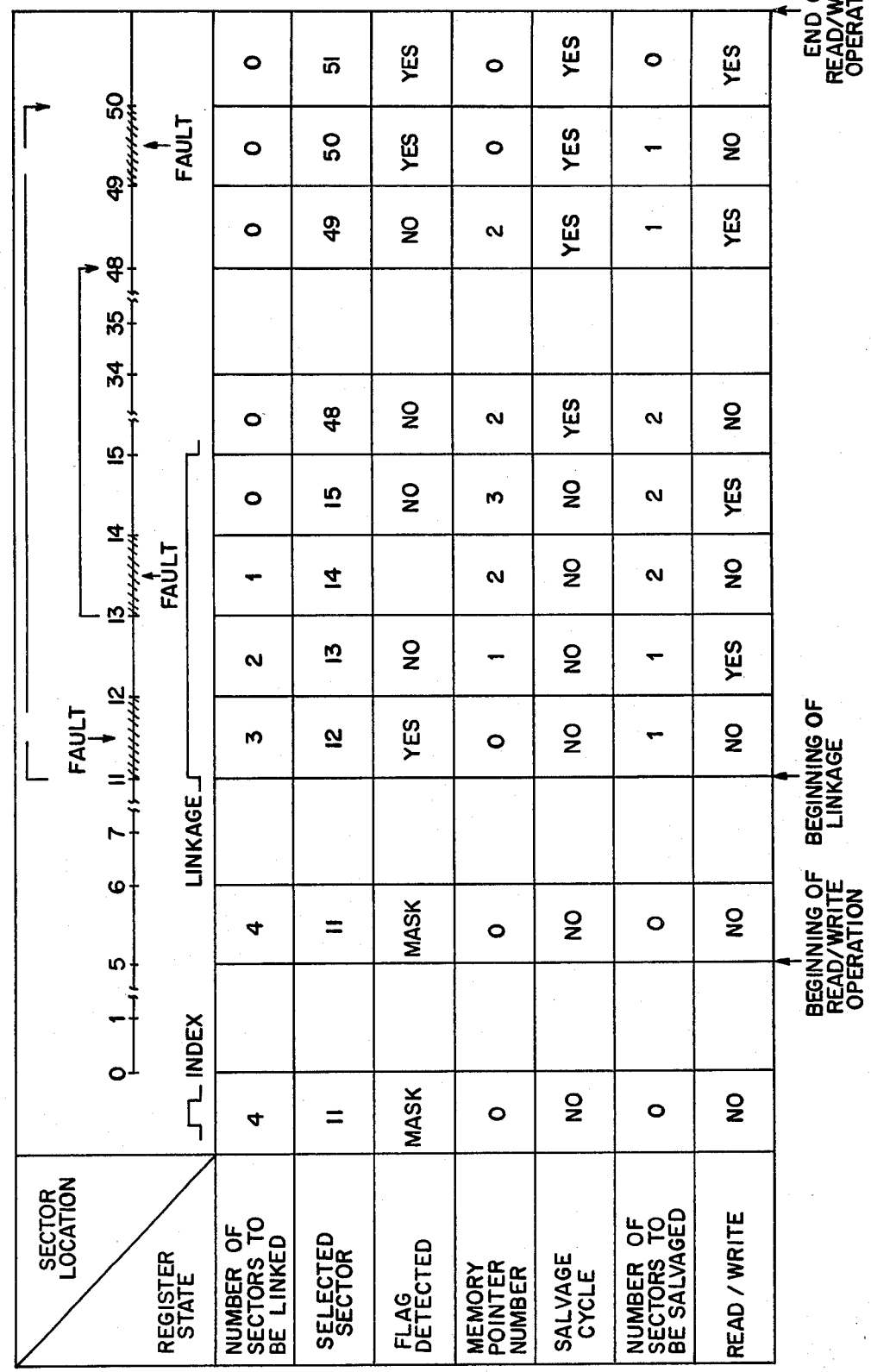

FIGS. 15A–15C are charts indicating various ways in which the apparatus of FIG. 4 operates. In FIG. 15A faults are illustrated as occurring in the sectors having physical addresses of 2, 7 and 12; the physical addresses 2, 7 and 12 have logic addresses of 1, 6 and 11 and respectively occur between the 2nd and 3rd, 7th and 8th, and 12th and 13th marker pulses. FIG. 15A deals only with the fault appearing at physical address 12. Sectors are linked together only when a required sector has been found. In the example of FIG. 15A, logic address 11 is incremented as each sector mark is derived during the linking sequence which occurs between sector physical addresses 12, 13, 14 and 15. When the linking sequence has been completed, sector address 48 is loaded into sector address register 15. A flag derived from AND gate 19 indicates that a fault has been detected between sector marks 12 and 13. The detected fault causes the flag derived from AND gate 19 to appear for the address of the required sector 13. The derivation of the fault flag prevents reading and writing between sector marks 12 and 13. However, for the remainder of the time allotted to the linking cycle, a read/write operation occurs. When the fault flag is derived from the output of AND gate 19, counter 9, indicating the number of sectors to be salvaged, is incremented by one, so an indication is provided that two sectors are to be salvaged. At the end of the linking cycle, flip-flop 13 is activated to the set state and a binary 1 signal is derived from the output thereof, enabling a salvage cycle to begin. The chart of FIG. 15A also indicates that reading or writing of information to be salvaged occurs between sector marks 48 and 49 in physical sector 48.

FIG. 15B is a chart indicating the operations which occur when two faults occur, with one of the faults being in a linking cycle and the other fault occurring between the end of a linking cycle and the beginning of a salvage zone. The fault which appears at the end of the linking cycle appears in physical sector 14 whereas the fault which appears between the end of the linking cycle and the beginning of the salvage zone appears in physical sector 30. Counter 9, which indicates the number of sectors to be salvaged, thus is incremented when a binary 1 is derived from the output of AND gate 19 in response to the fault being detected in sector 14, whereby the counter assumes value of one. Read/write operations for sector 14 are thus prevented but are enabled in sector 49 because counter 9 is decremented in response to the output of AND gate 35 in response to the sector mark detected at the beginning of the 15th physical sector.

In the chart of FIG. 15C, two faults occur in a linking cycle in sectors 11 and 13 and a fault appears in sector 49 of the salvage zone. Fault flags are thus derived at the output of AND gate 19 as the sector marks for physical sectors 11, 13 and 40 are derived. Therefore, data can be written or read from the disc only in sectors 12, 14, 48 and 50.

Reference to FIGS. 15A and 15B thus indicates that reading and writing operations are in sectors containing faults and that operations in these sectors are not performed until specified sectors in the salvage zone have been reached. When a write operation is deferred, the information to be written into the sector remains stored in one of the four highest numbered registers of buffer registers 2. The information is extracted from the particular register of buffer register 2 during the salvage cycle in reverse order from that in which it was stored in register 2.

While there has been described and illustrated one specific embodiment of the invention, it will be clear that variations in the details of the embodiment specifically illustrated and described may be made without departing from the true spirit and scope of the invention as defined in the appended claims.

Having thus disclosed, what is claimed is:

1. Apparatus for detecting faulty sectors and for allocating replacement sectors in a magnetic disc memory connected to a central processing unit, each face of a disc included in the memory being divided into sectors of a circle and into concentric tracks on which are recorded or from which are recovered data which are transferred between the central processing unit and the magnetic disc memory, said disc memory being associated with: (a) adjusting means for each track and sector, (b) magnetic transducers positioned immediately opposite each face of the disc for recovering and recording data from the disc, and (c) means for temporarily storing data which are transferred between the central processing unit and the disc memory, the apparatus comprising first means for recording data on and recovering data from fault-free sectors, second means for detecting faulty sectors and for indicating the order in which faulty sectors are detected, addressing means for sectors of the memory, the first means, second means and addressing means being coupled with third means for assigning a number of replacement sectors equal to the number of detected faulty sectors, said means for assigning being activated at the end of a track address by the addressing means.

2. Apparatus of claim 1 wherein the first means is controlled during recording and recovery of data from the magnetic disc in response to control signals derived by the central processing unit, means for storing the number of sectors used at the beginning of data transfer between the disc memory and the central processing unit, means for controlling said first means in response to said means for storing the number of sectors used, means for counting down the number of sectors as the sectors traverse past a transducer for recording and recovering data from the tracks, means for preventing reading and writing of data on and from a faulty sector, and means for controlling said first means in response to said means for preventing reading and writing.

3. Apparatus of claim 1 wherein the second means comprises further means for keeping account of the faulty sectors, means for storing the order in which the faulty sectors are detected, means for controlling said first means in response to the stored order, means for buffering data to be transferred between the central unit and the disc memory to identify, within the temporary storage means, the temporary storage means reserved for data which could not be transferred to the faulty sectors.

4. Apparatus of claim 1 wherein said third means comprises means for enabling the address of an initial replacement sector situated at the end of a track addressed by the track addressing means to be transferred to said means for addressing sectors.

5. Apparatus of claim 2 wherein the means for storing includes a counter driven in the reverse direction by the central processing unit as a function of the transfer of information between the central processing unit and the disc unit, said reversibly driven counter being decremented by a count of one each time a transition from one sector to the next sector traverses said transducers, said reverse driven counter deriving a control signal for said assigning means in response to a count of zero at the end of one of the tracks, whereby sectors stored in the assigning means are replaced by sectors affected by faults.

6. Apparatus of claim 1 or claim 2 or claim 3 or claim 4 or claim 5 wherein the third means includes means for keeping track of faulty sectors, said means for keeping track of faulty sectors being an up/down counter which is incremented by one each time a fault is detected in a sector, said up/down counter having outputs connected to a means for controlling said third means, said up/down counter being decremented by one unit in response to said third means for assigning replacement sectors at the end of a track address being activated.

7. In combination, a magnetic disc for storing binary information packed into the disc at such a high density that there is a significant probability of defects in the disc, said defects being determined at the time of disc manufacture, said disc including a plurality of concentric tracks for storing binary data, each of said tracks indicating binary bit values as changes in magnetic flux at spaced regions along the track, each track including a plurality of sectors of a circle, each sector including: track address positioning information, a number of address bits for the sector, and a space into which data bits can be written and read; each faulty sector of a track including a bit indicating that the sector of that track is faulty, each faulty sector of a track storing no binary data in the space thereof into which data bits can be written and read, each track including at least one salvage sector, the space of the salvage sector storing a sequence of binary data bits that would be stored in the space of the faulty sector of the track if the faulty sector were not faulty; a system coupling binary data between the disc and a binary processing unit for preventing reading of binary data bits from and writing of binary data bits into the space of any fault sector and for reading binary data bits from and writing binary data bits into the space of a salvage sector on the same track as the faulty sector instead of into the fault sector, and wherein the track includes plural salvage sectors, the system including a counter for storing the number of faulty sectors in a track, means responsive to a faulty sector indicating bit for incrementing said faulty segment counter, means responsive to each defective sector indicating bit for storing data bits originally designated for the defective sector, means responsive to said faulty segment counter indicating that the track contains a faulty sector for writing the data bits designated for the faulty sector as stored in the means for storing into the space of the salvage sector, means for decrementing the faulty segment counter in response to the writing means having written the bits designated for the faulty sector into the salvage sector, said means for writing being activated at a different salvage sector in the track until the counter is decremented to zero.

8. The combination of claim 7 further including means for linking a plurality of adjacent sectors of the same track together, a counter for indicating the number of adjacent sectors to be linked responsive to a signal indicating the number of sectors to be linked as derived from said processing unit, and means for decrementing said counter for the number of sectors to be linked in response to reading and writing of all bits into said spaces of a salvage sector as well as a non-salvage sector, said counter for the number of sectors to be linked being decremented until it has been decremented to zero to indicate that the sectors have been linked together, means for inhibiting said means for writing into the space of a salvage sector while said counter for the number of segments has a value other than zero.

9. A system for coupling binary data between a magnetic disc and binary processing unit, said disc storing binary information packed into the disc at such a high density that there is a significant probability of defects in the disc, said defects being determined at the time of manufacture, said disc including a plurality of concentric tracks for storing binary data, each of said tracks indicating binary bit values as changes in magnetic flux at spaced regions along the track, each track including track address positioning information, a number of address bits for the sector, and a space into which data bits can be written and read, each faulty sector including a bit indicating that it is faulty, each faulty sector storing no binary data in the space thereof into which data bits can be written and read, each track including plural salvage sectors, the space of each salvage sector storing a sequence of binary data bits that would be stored in the space of the faulty sector if the faulty sector were not faulty, the system preventing reading of binary data bits from and writing of binary data bits into the space of any faulty sector and for reading binary data bits from and writing binary data bits into the space of a salvage sector on the same track as the faulty sector instead of into the faulty sector, the system comprising: a counter for storing the number of faulty sectors in a track, means responsive to a faulty sector indicating bit for incrementing said faulty segment counter, means responsive to each defective sector indicating bit for storing data bits originally designated for the defective sector, means responsive to said faulty segment counter indicating that the track contains a faulty sector for writing the data bits designated for the faulty sector as stored in the means for storing into the space of the salvage sector, means for decrementing the faulty segment counter in response to the writing means having written the bits designated for the faulty sector into the salvage sector, said means for writing being activated at a different salvage sector in the track until the counter is decremented to zero.

10. The combination of claim 9 further including means for linking a plurality of adjacent sectors of the same track together, a counter for indicating the number of adjacent sectors to be linked responsive to a signal indicating the number of sectors to be linked as derived from said processing unit, and means for decrementing said counter for the number of sectors to be linked in response to reading and writing of all bits into said spaces of a salvage sector as well as a non-salvage sector, said counter for the number of sectors to be linked being decremented until it has been decremented to zero to indicate that the sectors have been linked together, means for inhibiting said means for writing into the space of a salvage sector while said counter for the number of segments has a value other than zero.

11. In combination, a magnetic disc for storing binary information packed into the disc at such a high density that there is a significant probability of defects in the disc, said defects being determined at the time of disc manufacture, said disc including a plurality of concentric tracks for storing binary data, each of said tracks indicating binary bit values as changes in magnetic flux at spaced regions along the track, each track including a plurality of sectors of a circle, each sector including: track address positioning information, a number of address bits for the sector, and a space into which data bits can be written and read; each faulty second of a track including a bit indicating that the sector of that track is faulty, each faulty sector of a track storing no binary data in the space thereof into which data bits can be written and read, each track including at least one salvage sector, the space of the salvage sector storing a sequence of binary data bits that would be stored in the space of the faulty sector of the track if the faulty sector were not faulty; a system coupling binary data between the disc and a binary processing unit for preventing reading of binary data bits from and writing of binary data bits into the space of any faulty sector and for reading binary data bits from and writing binary data bits into the space of a salvage sector on the same track as the faulty sector instead of into the fault sector, and further including means for linking a plurality of adjacent sectors of the same track together, a counter for indicating the number of adjacent sectors to be linked responsive to a signal indicating the number of sectors to be linked as derived from said processing unit, and means for decrementing said counter for the number of sectors to be linked in response to reading and writing of all bits into said spaces at a salvage sector as well as a non-salvage sector, said counter for the number of sectors to be linked being decremented until it has been decremented to zero to indicate that the sectors have been linked together, means for inhibiting said means for writing into the space of a salvage sector while said counter for the number of segments has a value other than zero.

* * * * *